UNITED STATES PATENT OFFICE.

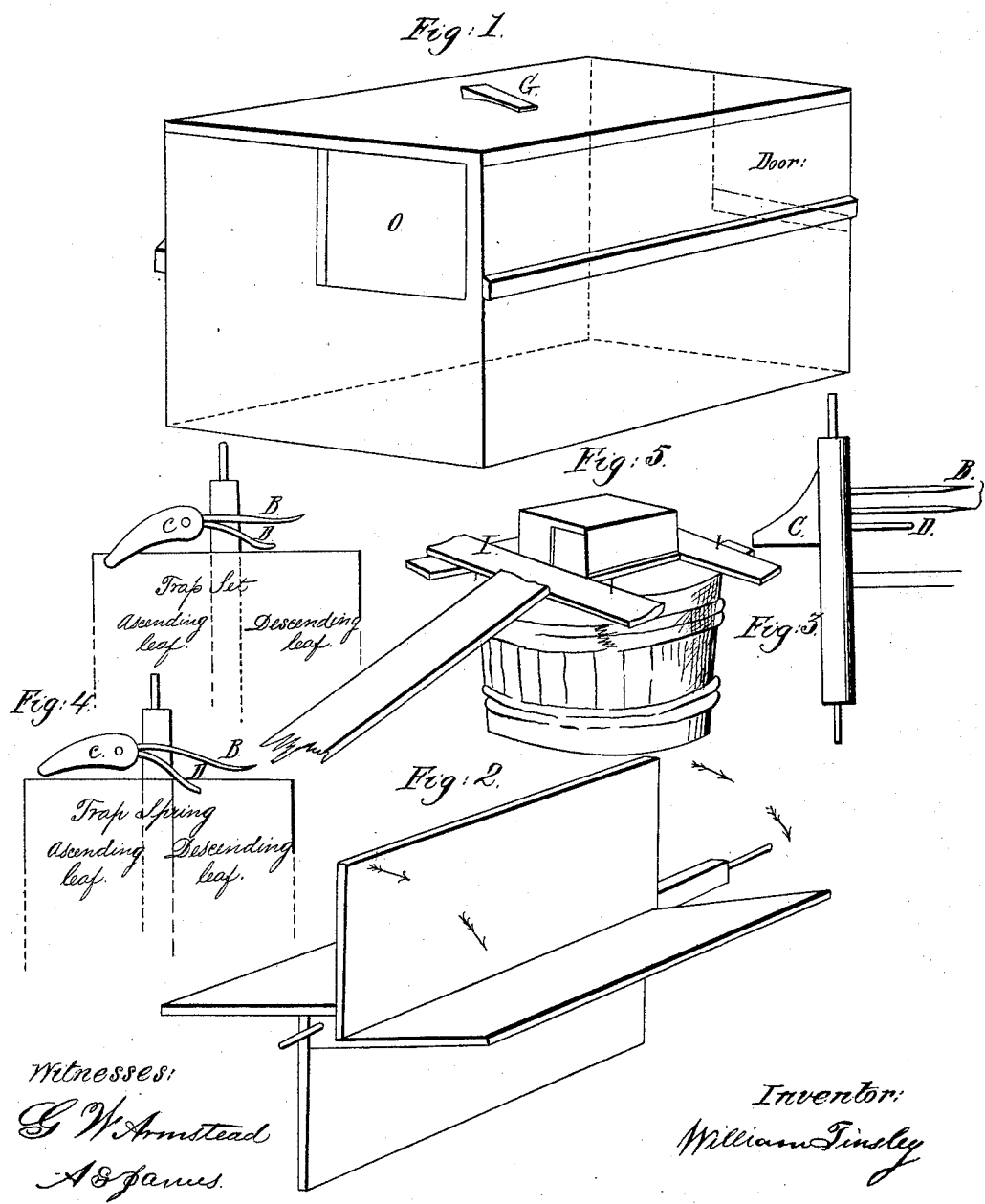

WILLIAM TINSLEY, OF NEW YORK, N. Y.

ANIMAL-TRAP.

Specification of Letters Patent No. 27,083, dated February 7, 1860.

*To all whom it may concern:*

Be it known that I, WILLIAM TINSLEY, of the city of New York, county of New York, and State of New York, have invented a new and Improved Vermin-Trap; and I do hereby declare that the following is a full, clear, and exact description of the construction and operation of the same, reference being had to the drawings annexed to and making part of my original specification, in which—

Figure 1, is a box open beneath, and at O, G is a pawl. Fig. 2, is a four leaved flutter wheel in perspective. Fig. 3, is a vertical plan of the escapement. Fig. 4, is a ground plan of the same, in two positions, set and sprung. Fig. 5, is a perspective of the whole, as set for use.

*Construction.*—The box (Fig. 1) is of rectangular shape, and convenient size. The top and longer sides are perfect, having no openings, perforations &c. The shorter sides, or ends are both cut away at right angles at one upper corner making a square ingress at one end of about one-fourth of the whole surface. The other end is partly covered by a small door, which is opened to adjust the bait, and closed to protect it. The under side is open, or in other words, the box has no bottom.

A four leaved flutter wheel (Fig. 2,) turning on pivots in the center of each end of the box plays lengthwise within it, and makes an alternating platform about one inch shorter than the box, to allow room for the escapement. The escapement consists of a vertical pillar (Fig. 3,) turning on pivots between two brackets attached to the end of the box, and at a point between the arbor of the wheel and the nearest side of the box (Fig. 4). Said pillar has three arms B, C, D, (Fig. 3,) projecting horizontally at different angles, and points of elevation. The long arm B, (of pointed wire) is made double, and carries the bait. The doubling enables it to retain a piece of flesh in a flat form. The arm B projects across the arbor of the wheel to about the middle of the descending leaf (Fig. 4,) or platform. The arm C projects making with B an angle of about 135° and extends over the end of the wheel, so that when B is thrown back C hold the wheel and platform horizontally in place, acting as a catch pin. The arm D forms an angle of about 90° with C, and is curved or bent outwardly from C, and serves to reverse the escapement after the trap is sprung. When B is thrown back (Fig. 4, " set ") C is upon the wheel, within the line of its motion, and D is without the line of motion, and its extremity is just behind the line of the vertical leaf. When B is drawn forward C is without the line of motion, and D (Fig. 4, " sprung ") within the line. The whole is suspended in a rough frame even with the platform over a tub of water, or any other receptacle.

Operation: The arm is baited and thrown back into position, (Fig. 4, " set "). The rat or other vermin enters at O (Fig. 1,) and proceeds along the platform toward the bait. By putting the bait forward he throws the arm C back, and liberates the wheel. The wheel turns and delivers him into the receptacle. In turning the wheel comes into contact with arm D, which is now within the line of motion, and by throwing it back restores B and C to their former position. The trap is now set. The wheel is prevented from recoil by the pawl G (Fig. 1). A new platform is formed of the next leaf of the wheel.

Claim—

I am aware that traps with revolving or tilting platforms are not novelties. I use the wheel as common property, and rest my claim upon the self-setting escapement of the pillar with its three arms, as set forth.

WILLIAM TINSLEY.

Witnesses:
G. W. ARMSTEAD,
A. S. JAMES.